(12) United States Patent
Martin, Jr. et al.

(10) Patent No.: US 7,340,057 B2
(45) Date of Patent: Mar. 4, 2008

(54) METHOD AND APPARATUS FOR DISTRIBUTING AUTHORIZATION TO PROVISION MOBILE DEVICES ON A WIRELESS NETWORK

(75) Inventors: Bruce K. Martin, Jr., Palo Alto, CA (US); Robert T. Wang, Castro Valley, CA (US); Michael E. S. Luna, Carnation, WA (US)

(73) Assignee: Openwave Systems Inc., Redwood City, CA (US)

( * ) Notice: Subject to any disclaimer, the term of this patent is extended or adjusted under 35 U.S.C. 154(b) by 817 days.

(21) Appl. No.: 09/904,010

(22) Filed: Jul. 11, 2001

(65) Prior Publication Data

US 2003/0023849 A1 Jan. 30, 2003

(51) Int. Cl.
- *H04K 1/00* (2006.01)
- *H04L 9/00* (2006.01)
- *H04L 9/32* (2006.01)

(52) U.S. Cl. .......................... 380/247; 713/176; 726/4
(58) Field of Classification Search ................. 380/247
See application file for complete search history.

(56) References Cited

U.S. PATENT DOCUMENTS

| | | | |
|---|---|---|---|
| 5,485,505 A | 1/1996 | Norman et al. |
| 5,586,260 A | 12/1996 | Hu |
| 5,603,084 A | 2/1997 | Henry, Jr. et al. |
| 5,673,322 A | 9/1997 | Pepe et al. |
| 5,719,918 A | 2/1998 | Serbetciouglu et al. |
| 5,727,159 A | 3/1998 | Kikinis |
| 5,732,074 A | 3/1998 | Spaur et al. |
| 5,742,905 A | 4/1998 | Pepe et al. |
| 5,809,415 A | 9/1998 | Rossmann |
| 5,812,953 A | 9/1998 | Griffith et al. |
| 5,841,764 A | 11/1998 | Roderique et al. |
| 5,848,064 A | 12/1998 | Cowan |
| 5,875,394 A | 2/1999 | Daly et al. |
| 5,943,399 A | 8/1999 | Bannister et al. |
| 5,956,636 A | 9/1999 | Lipsit |

(Continued)

FOREIGN PATENT DOCUMENTS

EP 0804045 A2 10/1997

(Continued)

OTHER PUBLICATIONS

Harrington, D., et al.: "An Architecture For Describing SNMP Management Frameworks", Apr. 1999, XP-002241315, pp. 1-62.

(Continued)

*Primary Examiner*—Ayaz Sheikh
*Assistant Examiner*—Kaveh Abrishamkar
(74) *Attorney, Agent, or Firm*—Blakely Sokoloff Taylor & Zafman LLP

(57) ABSTRACT

A method and apparatus for distributing authorization to provision devices on a wireless network are described. A primary trusted provisioning domain (TPD) operating within a trusted environment established by the wireless carrier's firewall can provision the mobile devices. The primary TPD may distribute the authorization to provision one or more of the mobile devices to one or more secondary TPDs operating outside the trusted environment. Digital signatures may be used to authenticate provisioning requests from TPDs.

30 Claims, 4 Drawing Sheets

U.S. PATENT DOCUMENTS

| | | | |
|---|---|---|---|
| 6,031,830 A | 2/2000 | Cowan | |
| 6,049,821 A | 4/2000 | Theriault et al. | |
| 6,052,442 A | 4/2000 | Cooper et al. | |
| 6,065,120 A | 5/2000 | Laursen et al. | |
| 6,094,587 A | 7/2000 | Armanto et al. | |
| 6,138,009 A | 10/2000 | Birgerson | |
| 6,138,158 A | 10/2000 | Boyle et al. | |
| 6,148,405 A | 11/2000 | Liao et al. | |
| 6,151,628 A | 11/2000 | Xu et al. | |
| 6,173,316 B1 | 1/2001 | De Boor et al. | |
| 6,195,366 B1 | 2/2001 | Kayashima et al. | |
| 6,195,546 B1 | 2/2001 | Leung et al. | |
| 6,195,547 B1 | 2/2001 | Corriveau et al. | |
| 6,233,577 B1 * | 5/2001 | Ramasubramani et al. | 707/9 |
| 6,233,608 B1 | 5/2001 | Laursen et al. | |
| 6,253,326 B1 | 6/2001 | Lincke et al. | |
| 6,266,539 B1 | 7/2001 | Pardo | |
| 6,275,693 B1 | 8/2001 | Lin et al. | |
| 6,295,291 B1 | 9/2001 | Larkins | |
| 6,311,057 B1 | 10/2001 | Barvesten | |
| 6,343,323 B1 | 1/2002 | Kalpio et al. | |
| 6,366,791 B1 | 4/2002 | Lin et al. | |
| 6,418,330 B1 | 7/2002 | Lee | |
| 6,421,781 B1 | 7/2002 | Fox et al. | |
| 6,456,852 B2 | 9/2002 | Bar et al. | |
| 6,493,743 B2 | 12/2002 | Suzuki | |
| 6,501,967 B1 | 12/2002 | Makela et al. | |
| 6,516,203 B1 | 2/2003 | Enzmann et al. | |
| 6,571,221 B1 * | 5/2003 | Stewart et al. | 705/52 |
| 6,647,260 B2 | 11/2003 | Dusse et al. | |
| 6,668,055 B2 | 12/2003 | Marwell et al. | |
| 6,671,714 B1 | 12/2003 | Weyer et al. | |
| 6,687,242 B1 | 2/2004 | Enzmann et al. | |
| 6,697,484 B1 | 2/2004 | Fleming, III | |
| 6,714,637 B1 | 3/2004 | Kredo | |
| 6,782,208 B1 | 8/2004 | Lundholm et al. | |
| 6,795,702 B2 | 9/2004 | Sennett | |
| 6,839,424 B1 | 1/2005 | Burnett | |
| 6,880,080 B1 * | 4/2005 | Penders | 713/156 |
| 6,882,860 B1 | 4/2005 | Kim | |
| 6,909,910 B2 | 6/2005 | Pappalardo et al. | |
| 7,107,248 B1 * | 9/2006 | Asokan et al. | 705/67 |
| 2001/0001160 A1 | 5/2001 | Shoff et al. | |
| 2001/0024965 A1 | 9/2001 | Hayashi | |
| 2001/0032254 A1 | 10/2001 | Hawkins | |
| 2001/0055299 A1 | 12/2001 | Kelly | |
| 2002/0009184 A1 | 1/2002 | Shnier | |
| 2002/0019225 A1 | 2/2002 | Miyashita | |
| 2002/0046299 A1 | 4/2002 | Lefeber et al. | |
| 2002/0052224 A1 | 5/2002 | Yoon | |
| 2002/0068554 A1 | 6/2002 | Dusse | |
| 2002/0082054 A1 | 6/2002 | Keinonen et al. | |
| 2002/0123335 A1 | 9/2002 | Luna et al. | |
| 2002/0128036 A1 | 9/2002 | Yach et al. | |
| 2002/0161723 A1 * | 10/2002 | Asokan et al. | 705/67 |
| 2002/0194352 A1 | 12/2002 | Ho et al. | |
| 2002/0194584 A1 * | 12/2002 | Suorsa et al. | 717/176 |
| 2003/0003935 A1 | 1/2003 | Vesikivi et al. | |
| 2003/0023371 A1 | 1/2003 | Stephens | |
| 2004/0066920 A1 | 4/2004 | Vandermeijden | |
| 2004/0067751 A1 | 4/2004 | Vandermeijden et al. | |
| 2005/0049002 A1 | 3/2005 | White et al. | |

FOREIGN PATENT DOCUMENTS

| | | |
|---|---|---|
| EP | 1 043 906 A2 | 10/2000 |
| EP | 1043905 A2 | 10/2000 |
| EP | 1091606 A2 | 4/2001 |
| EP | 001094682 A1 * | 4/2001 |
| EP | 1 043 906 A3 | 1/2002 |
| EP | 1 043 905 A3 | 9/2002 |
| WO | WO 95/15065 A1 | 6/1995 |
| WO | WO 97/13382 | 4/1997 |
| WO | WO 97/28662 A1 | 8/1997 |
| WO | WO 98/56202 | 12/1998 |
| WO | WO 98/58506 | 12/1998 |
| WO | WO 99/05613 A1 | 2/1999 |
| WO | WO 99/07173 A1 | 2/1999 |
| WO | WO 00/46963 | 8/2000 |
| WO | WO 00/56015 | 9/2000 |
| WO | WO 00/46963 * | 10/2000 |
| WO | WO 01/39526 A1 | 5/2001 |
| WO | WO 01/58110 A2 | 8/2001 |
| WO | WO 01/58110 A3 | 8/2001 |
| WO | WO 01/69891 A1 | 9/2001 |
| WO | WO 01/69903 A1 | 9/2001 |

OTHER PUBLICATIONS

Davin, J., et al.: "SNMP Administrative Model", Jul. 1992, XP-002272696, pp. 1-35.

Wijnen, B., et al.: "View-Based Access Control Model (VACM) For The Simple Network Management Protocol (SNMP)", Jan. 1998, XP-002272695, pp. 1-36.

"Openwave™ Download Fun," pp. 1-2, Jun. 2001.

"Openwave™ Download Fun," pp. 1-2, downloaded from http://www.openwave.com/products/platform_services/downloaded_fun/index.html, Aug. 31, 2001.

* cited by examiner

METHOD AND APPARATUS FOR DISTRIBUTING AUTHORIZATION TO PROVISION MOBILE DEVICES ON A WIRELESS NETWORK

FIELD OF THE INVENTION

The present invention pertains to techniques for provisioning devices on a wireless network. More particularly, the present invention relates to a method and apparatus for distributing the authorization to provision mobile devices on a wireless network between multiple provisioning servers.

BACKGROUND OF THE INVENTION

Wireless network operators ("carriers") generally require capability to provision mobile devices that operate on their networks. "Provisioning" may be defined as dynamically and transparently providing a device with information which enables a service to be performed on the device (i.e., configuring the device). For example, a cellular telephone carrier may require the ability to program into cellular telephones that operate on its network, information such as network addresses (e.g., the home page of an Internet-enabled cellular telephone), user preferences (e.g., user bookmark Uniform Resource Locators (URLs)), and privileges (e.g., email account ID and password). This process is normally performed by a provisioning server operated by the wireless carrier, in cooperation with software on the mobile device. The provisioning server typically is a conventional server-class computer system that is coupled to the wireless network. An example of such a provisioning server is one which executes the Openwave Provisioning Manager (OPM), available from Openwave Systems Inc. of Redwood City, Calif. The software on the mobile device may be a browser in the mobile device (sometimes called a "browser" or "minibrowser" in a mobile device), such as the UP.Browser of Openwave Systems. In conjunction with the UP.Browser, the OPM has the ability to provision a mobile device, such as a cellular telephone, remotely over the air via a wireless network.

It is desirable to control the ability to provision mobile devices to prevent unauthorized provisioning. This goal is especially important now that cellular telephones and other wireless devices have the ability to access the Internet. The Internet potentially provides an access channel to the mobile devices for millions of users, some of whom could attempt to use this channel to perform unauthorized provisioning of mobile devices. Accordingly, a wireless carrier normally operates a provisioning server within a secure ("trusted") environment, using a conventional firewall, for example.

Before a provisioning server can modify mobile device configuration information, including configuration pertaining to both device and browser layer, the provisioning server must be recognized as the trusted provisioning domain (TPD) by the mobile device. Currently, mobile devices can only recognize one trusted provisioning domain. Consequently, all provisioning commands must come from the same provisioning server, i.e. the one identified by mobile device as the TPD. As the application and usage of wireless Internet grows, however, wireless carriers will need to have the flexibility to allow third parties outside the carrier's firewall, such as application and content providers, to initiate provisioning events, without compromising the security of mobile devices. For example, it may be desirable to enable Internet portals to provision mobile devices with users' personal contact lists (e.g., names, addresses, etc.), or to enable Internet service providers (ISPs) to program network addresses into mobile devices. Previously, however, there has been no solution which allows these actions to be done without compromising security.

SUMMARY OF THE INVENTION

The present invention includes a method and apparatus to allow the provisioning of multiple processing devices on a network. In the method, a first provisioning system authorized to provision a processing device on the network is operated within a trusted environment. The first provisioning system is used to authorize a second provisioning system outside the trusted environment to provision the processing device.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus are described, for distributing the authorization to provision mobile devices on a wireless network between multiple provisioning servers, which may operate in different "trusted environments". Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. For example, a feature, structure, act, etc. described in one embodiment may also be included in other embodiments. Thus, the present invention can include any variety of combinations and/or integrations of the embodiments described herein.

Described herein is a technique that will support multiple trusted provisioning domains (TPDs) for mobile devices and provide a solution to allow wireless carriers to control and distribute provisioning authorization without compromising security. As described in greater detail below, a primary TPD includes one or more provisioning servers that operate within a trusted environment on the wireless network and can provision the mobile devices. The primary TPD may distribute authorization to provision mobile devices to one or more secondary TPDs, each of which includes one or more provisioning servers that operate outside the trusted environment. Any of the secondary TPDs may operate on a network other than the wireless network. Digital signatures based on public key encryption can be used by any of the provisioning servers for increased security when provisioning the mobile devices.

The embodiments described herein are based on a usage model in which provisioning authorization is hierarchical, i.e. a primary provisioning server delegates provisioning authorization one or more secondary provisioning servers. Note, however, that other types of usage models may be used; for example, provisioning authorization could be distributed among peered provisioning servers.

Figure 1:
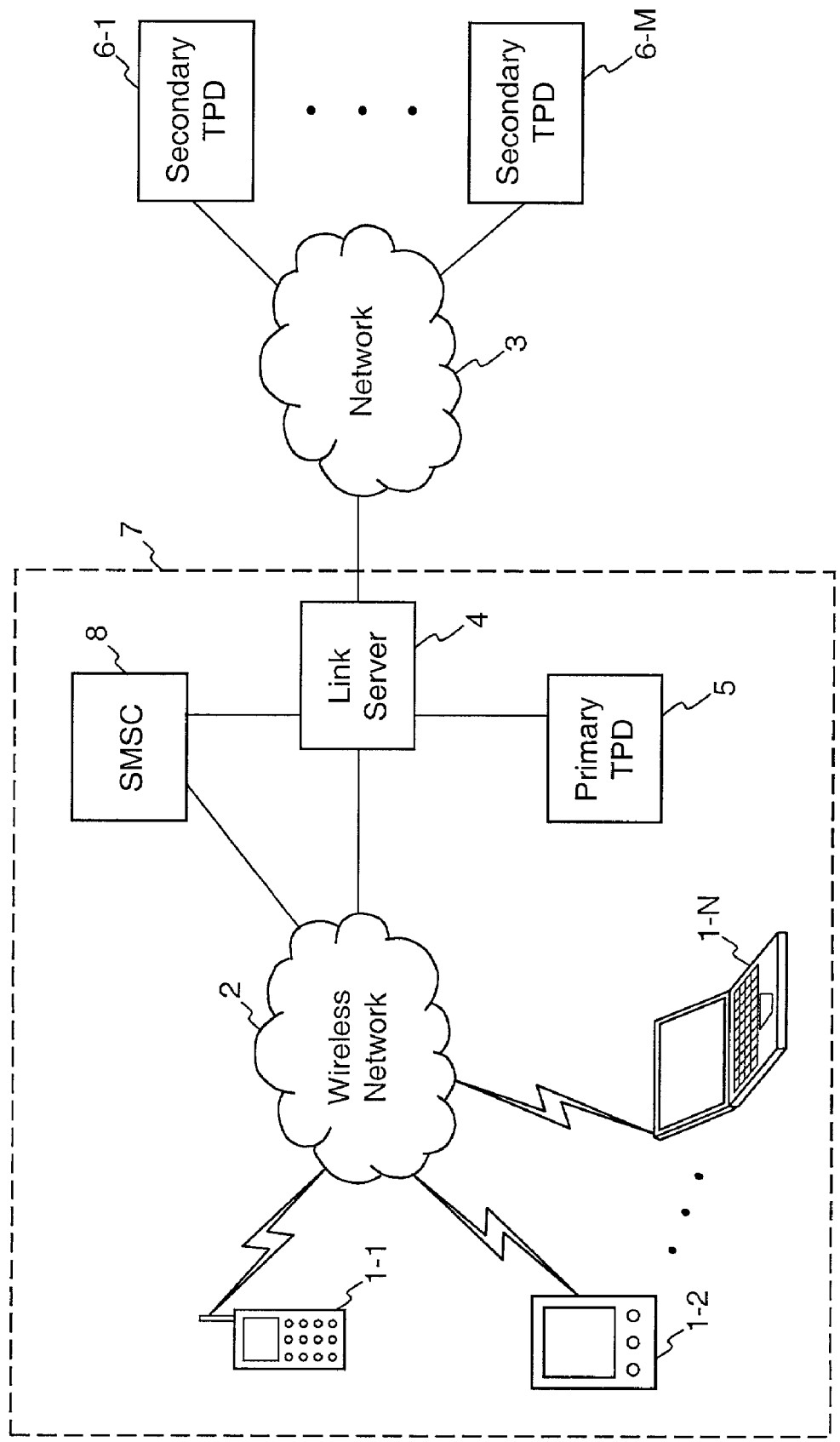
FIG. 1 illustrates a network environment in which the present invention may be implemented.

Refer now to FIG. 1, which illustrates a network environment in which the present invention can be implemented. As shown, a number (N) of mobile devices 1-1 through 1-N operate on a wireless network 2. The wireless devices 1 may include any of various types of mobile devices, such as cellular telephones, personal digital assistants (PDAs), notebook (laptop) computers, or the like. In the illustrated embodiment, the wireless network 2 is coupled through a link server 4 to another network (or internetwork) 3. Network 3 may be, for example, the Internet, a corporate intranet, a wide area network (WAN), a local area network (LAN), or a combination thereof. A short message service center (SMSC) 8 is coupled to the link server 4 and to the wireless network 2.

The link server 4 uses conventional techniques to enable communication between devices on wireless network 2 and devices on network 3. For example, if the network 3 is the Internet, the link server 4 may include a wireless access protocol (WAP) gateway; that is, link server 4 performs conversion and/or translation between the languages and protocols used by devices on the Internet, such as hypertext markup language (HTML) and hypertext transport protocol (HTTP), and the languages and protocols used by the wireless devices, such as wireless markup language (WML) and WAP. An example of such a device is the Mobile Access Gateway, available from Openwave Systems. The link server 4 may also perform other functions which are not germane to the present invention. The link server 4 may be owned and/or operated by the operator of the wireless network 2 (the wireless carrier), although that is not necessarily the case.

Assuming a hierarchical provisioning system for purposes of this description, a primary TPD 5 is coupled to the link server 4. The primary TPD 5, which includes one or more provisioning servers, controls the privileges of all other TPDs, referred to as secondary TPDs 6. Each of the secondary TPDs 6 also includes one or more provisioning servers. The primary TPD 5 may be owned and/or operated by the wireless carrier, although that is not necessarily the case. The primary TPD 5 may be implemented using, for example, the OPM of Openwave Systems.

In embodiments represented in FIG. 1, the carrier's firewall establishes a trusted ("secure") environment 7 that includes the mobile devices 1, the link server 4, and the primary TPD 5 (and possibly other processing systems operated by the carrier), but excludes network 3 and all devices which are directly coupled to it. As shown in FIG. 1, the devices coupled to network 3 include one or more secondary TPDs 6-1 through 6-M. Although not shown as such in FIG. 1, a secondary TPD 6 might alternatively be coupled directly to the wireless network 2 or elsewhere, but still outside the carrier's trusted environment 7. Similarly, in other embodiments a primary TPD 5 might be coupled directly to the wireless network 2 and/or directly to network 3, yet still inside the carrier's trusted environment 7.

Prior to the present invention, mobile devices could only recognize one TPD. Consequently, all provisioning commands were required to be originated from the same TPD. The techniques described herein allow authorization to provision mobile devices to be granted to one or more secondary TPDs 6, which may be outside the primary TPD's trusted environment 7, without compromising security. The provisioning authorization may be granted by the primary TPD 5 to the secondary TPDs 6 or by any other trusted source. The provisioning authorization granted to a secondary TPD 6 can be limited to a specified scope. For example, a secondary TPD 6 operated by an Internet portal might be granted only the authorization to configure specified mobile devices with their users' contact lists. As another example, a secondary TPD 6 operated by an ISP might be granted only the authorization to program Internet Protocol (IP) addresses into specified mobile devices.

Further, the described techniques can also be applied to allow a secondary TPD 6, once it is authorized to provision a mobile device 1, to delegate some or all of its provisioning authority to one or more other secondary TPDs 6. This principle may be extended to allow successive delegation of provisioning authority down a delegation "chain" containing essentially any number of secondary TPDs 6. In an embodiment which allows such delegation, a secondary TPD 6 can delegate authority to provision only the parameters which it is authorized to provision itself. The ability to delegate provisioning authority may be a parameter which is provisioned by the primary TPD 5 or by any TPD from which the TPD attempting to delegate received its provisioning authority (either directly or indirectly).

Figure 2:
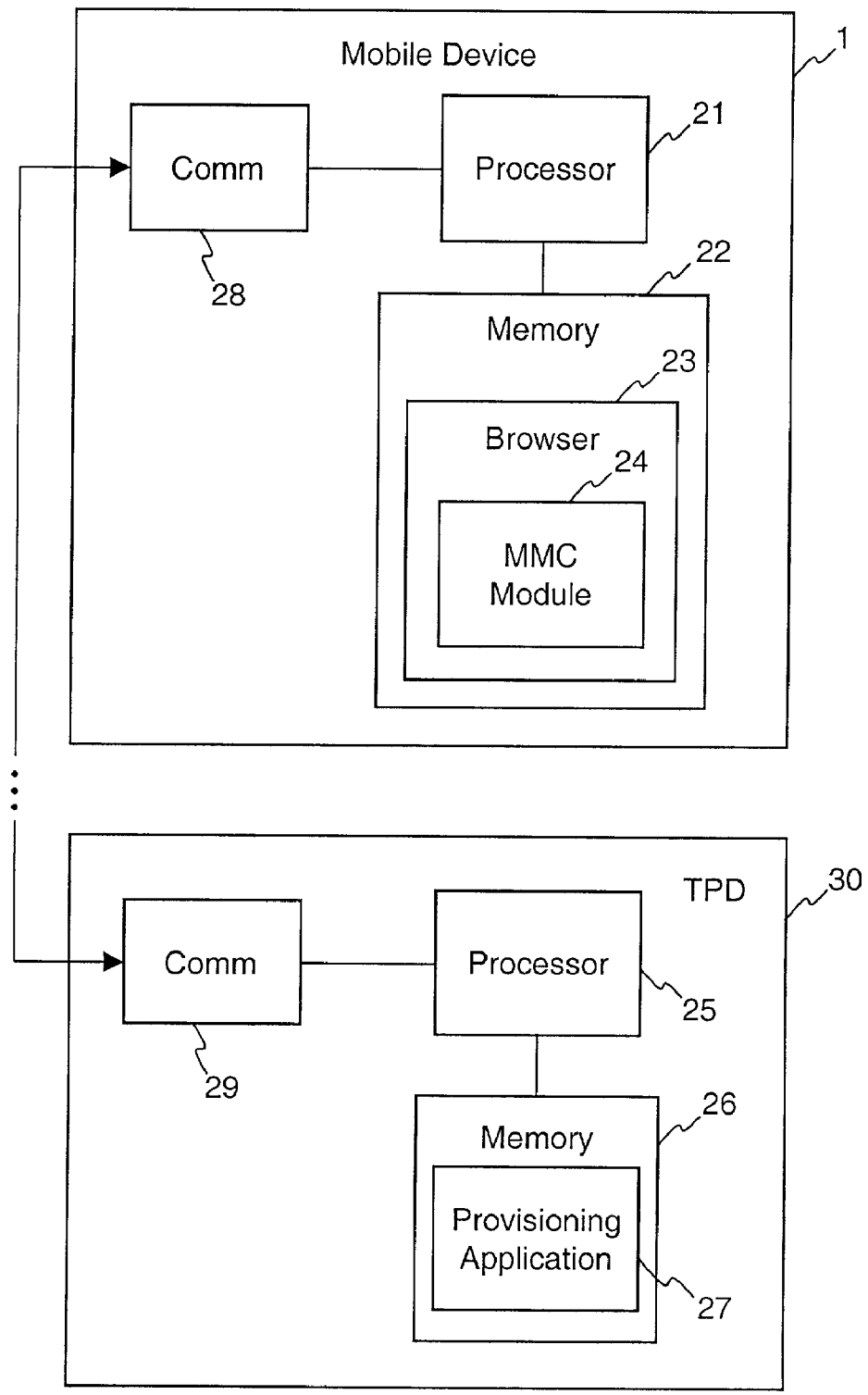
FIG. 2 is a block diagram showing an abstraction of a mobile device and a trusted provisioning domain (TPD)

FIG. 2 shows a high-level abstraction of a mobile device 1 and a provisioning server 30, according to one embodiment. Provisioning server 30 represents any provisioning server in either a primary TPD 5 or a secondary TPD 6. The mobile device 1 includes a processor 21, as well as a memory 22 and a data communication device 28 coupled to processor 21. The provisioning server 30 includes a processor 25 as well as a memory 26 and a data communication device 29 coupled to processor 25. Of course, both the mobile device 1 and the provisioning server 30 may also include other components not shown, such as: input/output (I/O) devices, additional storage devices, buses and/or adapters, etc. The details of such other components are not necessary for understanding the present invention and are well-known to those skilled in the art. Each of the processors 21 and 25 may be, or may include, one or more general- or special-purpose microprocessors, digital signal processors (DSPs), application specific integrated circuits (ASICs), programmable logic devices (PLDs), or the like, or a combination of such devices. Each of memories 23 and 26 may be, for may include, random access memory (RAM), flash or read-only memory (ROM) (which may be programmable), one or more non-volatile mass storage devices (e.g., magnetic disk, CD-ROM, DVD), or the like, or a combination of such devices. Each of the data communication devices 28 and 29 may be, or may include, a wireless transceiver (particularly device 28 in mobile device 1), a conventional or broadband modem, an Ethernet adapter, or the like.

The memory 26 of the provisioning server 30 includes application software ("provisioning application") 27 executable by the processor 25 to provision the mobile device 1, which may include granting provisioning authorization to other TPDs. The provisioning application 27 communicates provisioning requests and parameters to the mobile device 1, as described further below. The memory 22 of the mobile device 1 stores a browser 23, which includes a Mobile Management Command (MMC) module 24. Except as otherwise described herein, browser 23 is a conventional browser for a mobile device, such as the Openwave UP.Browser. The MMC module 24 is a component (e.g., a process) of the browser 23 which manages the provisioning transaction protocol, decomposes the provisioning content, and performs the requested provisioning operations in the mobile device 1. In other embodiments, provisioning could be managed in the mobile device 1 by an entity other than the browser 23, such as a separate provisioning application in the mobile device 1, which may also be stored in memory 22.

In the illustrated embodiment, the MMC module 24 is given control by the browser 23 whenever any data received by the browser 23 is determined to be or contain an MMC document. An MMC document is an extensible markup language (XML) document that contains commands that specify the name and contents of parameters ("MMC objects") to write or the name of parameters to read.

Provisioning of a mobile device 1 is accomplished by writing one or more MMC objects in the mobile device 1. The browser 23 in the mobile device 1 is configured to recognize MMC objects, which are parameters of the browser 23 or registers of the mobile device 1, and which may be included in an MMC document. One of the MMC objects, browser:domain.trusted, stores the definition (e.g., the URL) of the primary TPD 5. One way to provision the primary TPD 5 in a mobile device 1 is by writing the object browser:domain.trusted in the mobile device 1. Alternatively, the primary TPD can be set using other techniques, such as by a custom Wireless Session Protocol (WSP) heading during session initiation between the mobile device 1 and the link server 4, by pre-provisioning it in the mobile device or in a subscriber identity module (SIM), or by another trusted network element, such as the link server 4.

When the mobile device 1 retrieves a document from an origin server (e.g., a TPD), the browser 23 determines whether the document is an MMC document. An MMC document normally contains one or more MMC objects. The browser 23 automatically recognizes an MMC document based on a document type identifier in the header of the document. If the retrieved document is an MMC document, the browser 23 checks the document source against browser:domain.trusted to verify the provisioning privilege, i.e. to verify the origin server is in fact the TPD.

Note that in other embodiments, a provisioning message can be recognized by a mobile device 1 using other techniques, particularly if provisioning is handled in the mobile device 1 by an entity other than the browser 23. As one example, a mobile device 1 might consider any messages that are on a predetermined network "port" to be provisioning messages.

In addition to the above-mentioned MMC object, two other types of MMC objects can be written in a mobile device 1, designated browser:domain..<p>.trusted and browser:domain..<p>.object..<c>.name, which the browser 23 in the mobile device 1 is designed to recognize, and which contains provisioning privileges of any secondary TPDs 6 and the MMC objects they are privileged to provision. Both p and c in these objects are variables, each representing an array. For example, browser:domain..<1>.trusted can represent provisioning server 6-1 in FIG. 1, browser:domain..<2>.trusted can represent provisioning server 6-2, and so forth. The set of objects browser:domain..<p>.object..<c>.name are the MMC objects that provisioning server p has authorization to provision. For example, browser:domain..<1>.object..<c>.name can represent the MMC objects that provisioning server 6-1 has authorization to provision. Each value of browser:domain..<p>.trusted is a text value which is fully qualified domain name. Each value of browser:domain..<p>.object..<c>.name is a text value which is the name of an MMC object, e.g. "browser:email.ipaddress".

The MMC objects may be written to a mobile device 1 by including them in an MMC document, which is sent from a provisioning server to the mobile device 1 via the link server 4, using WAP. When provisioning is performed by the primary TPD 5, it may include distributing authorization to provision the mobile device 1 to one or more secondary TPDs 6. Distributing authorization to provision a mobile device 1 is normally accomplished by the primary TPD 5 specifying values of the object browser:domain..<p>.trusted to define one or more secondary TPDs 6, and specifying values of the object browser:domain..<p>.object..<c>.name to define the specific provisioning authorities for each browser:domain..<p>.trusted. A particular secondary TPD 6 may be given limited provisioning authorization, which may or may not coincide with the provisioning authorization of the primary TPD 5 or any other secondary TPD 6. In one embodiment, only the primary TPD 5 can modify browser:domain..<p>.trusted and browser:domain..<p>.object..<c>.name objects. This approach allows separate management and modification of each secondary TPD 6. As noted above, the provisioning authorization granted to a secondary TPD 6 may include the authorization for the secondary TPD 6 to delegate some or all of its provisioning authority to other secondary TPDs 6.

Figure 3:
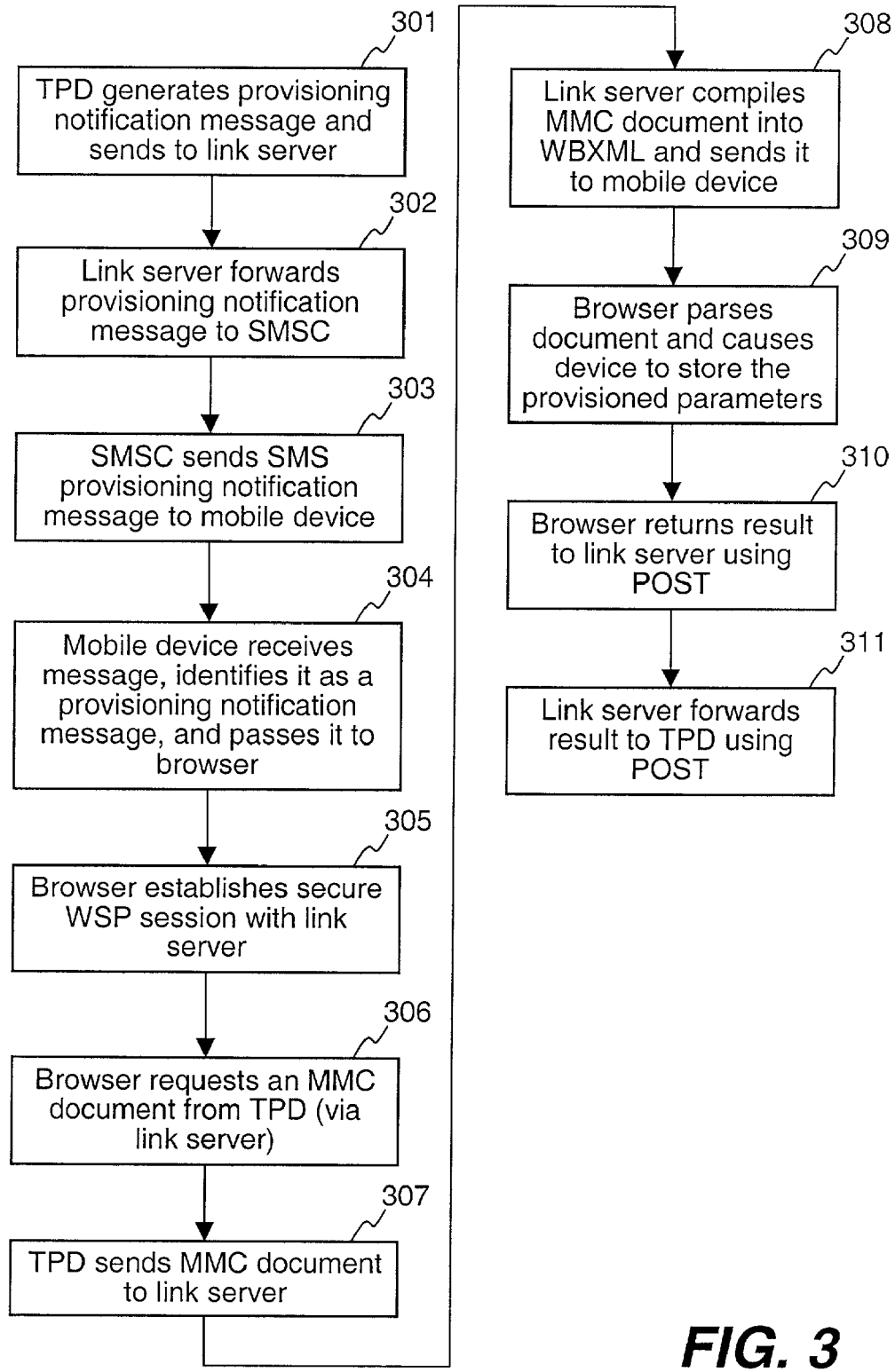
FIG. 3 is a flow diagram illustrating a process of provisioning a mobile device, according to one embodiment of the present invention.

FIG. 3 shows a process of provisioning a mobile device 1, according to one embodiment, which may be initiated by either the primary TPD 5 or a secondary TPD 6. The initial stage of the provisioning process is to establish the initial set of conditions in the mobile device 1, such that the TPD is known to the mobile device 1 and parameter provision can begin. Thus, at block 301 an authorized TPD (primary TPD 5 or an authorized secondary TPD 6) generates and sends a provisioning notification message to the link server 4, to initiate the process of establishing a session with the mobile device 1. Next, at block 302 the link server 4 forwards the provisioning notification message to the SMSC 8, which sends the provisioning notification message to the mobile device 1 at block 303 as an SMS message over the wireless network 2 using conventional techniques. The SMS message begins with a set of predetermined characters (e.g., "//PP"), previously programmed into the mobile device 1, to allow the mobile device 1 to identify the message as a provisioning notification message for establishing a provisioning session.

Thus, at block 304 the mobile device 1 receives the SMS provisioning notification message, identifies it as such, and passes it to the browser 23. The browser 23 responds to the provisioning notification message by establishing a secure WSP session with the link server 4 at block 305. This may be accomplished in any of several ways. For example, a home page service in the link server 4 may serve as an entry point for the remainder of the provisioning process. If, however, the link server 4 is a standard WAP gateway without a homepage service, the provisioning notification message may provide a homepage URL that the browser 23 contacts to commence the operational stage.

Hence, after establishing the connection, at block 306 the browser 23 sends a request for an MMC document to the TPD over the wireless network 2 via the link server 4. The request is sent as an HTTP GET message. At block 307 the TPD sends the MMC document to the link server 4. At block 308 the link server 4 compiles the XML based MMC document into a WAP Binary XML (WBXML) document and sends it to the mobile device 1 over the wireless network 2. At block 309 the mobile device 1 receives the compiled MMC document, where the browser 23 parses the document and causes the mobile device 1 to store the provisioned parameters (MMC objects) as specified in the document. The parameters may be stored in, for example, programmable ROM (e.g., flash memory) in the mobile device 1. Before causing the parameters to be stored, however, the browser 23 confirms that the source TPD is authorized to provision the specified parameters, the process of which is described further below. Next, at block 310 the browser 23 returns the result (status) of the provisioning operation (e.g., "OK" in the event of success or "Error" in the event of failure) to the link server 4 using an WSP or HTTP POST message. The link server 4 then forwards the result to the TPD at block 311, using HTTP POST.

Figure 4:
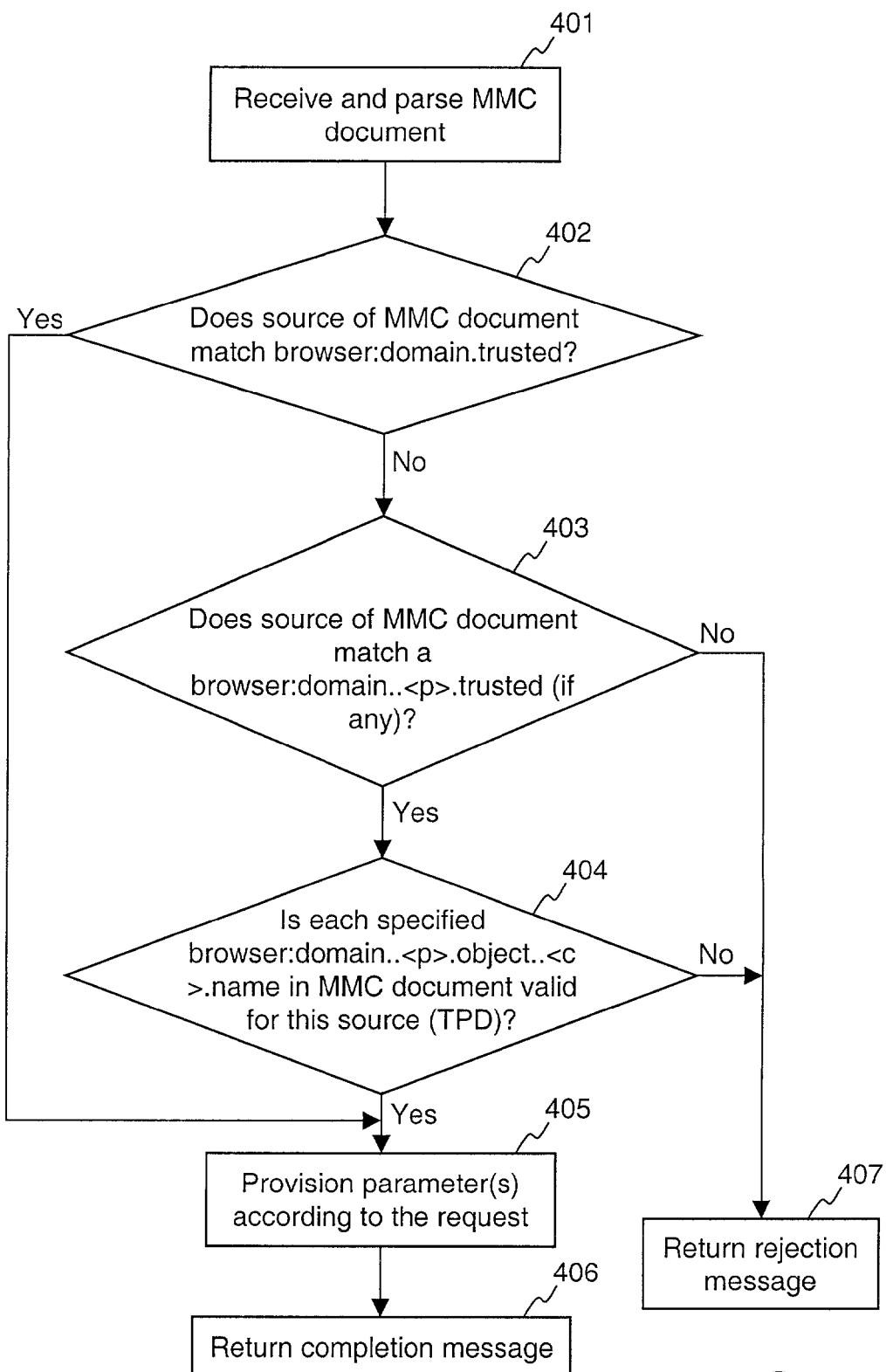
FIG. 4 is a flow diagram illustrating a process which may be performed by the browser in a mobile device in response to receiving a Mobile Management Command (MMC) document.

FIG. 4 illustrates a process which may be performed by the browser 23 in the mobile device 1 in response to receiving an MMC document. At block 401 the MMC module 24 in the browser 23 receives and parses the MMC document. At block 402 the MMC module 24 determines whether the source of the MMC document matches the object, browser:domain.trusted. If there is a match, then the process branches to block 405, in which the MMC module 24 causes the mobile device 1 to store the parameters (MMC objects) specified by the MMC document. At block 406 (or block 310 in FIG. 3) the browser 23 returns the completion result to the link server 4. If no match is found at block 402, the MMC module 24 determines at block 403 whether the source of the MMC document matches any browser: domain..<p>.trusted value previously provisioned in the mobile device 1.

If a match is found at block 403, then the MMC module 24 determines at block 404 whether each browser: domain..<p>.object..<c>.name value specified in the MMC document is valid for the matching browser: domain..<p>.trusted value, according to the previous provisioning. If each such object is determined to be valid, the process continues from block 405 as described above. If no match is found at block 403, or if a specified browser: domain..<p>.object..<c>.name object is determined not to be valid for this source (browser:domain..<p>.trusted) at block 404, then the browser 23 returns a rejection message to the link server 4 at block 407.

A similar verification process may be performed in the mobile device 1 in response to a request to read an MMC object. Of course many variations upon the foregoing process and the process of FIG. 3 are possible. For example, if some but not all of the browser: domain..<p>.object..<c>.name values specified in the MMC document are valid for the source (browser: domain..<p>.trusted), it may be desirable to provision the valid value in the mobile device 1, rather than rejecting the entire provisioning request. Hence, the browser 23 may be configured to perform accordingly.

Assume, for example, that the goal of a particular provisioning operation is for a secondary TPD 6 with the domain name, provision.someisp.com, to be given the authorization to provision the IP address, user name, and password of an email account for a mobile device 1. Assume further that these parameters are defined in the mobile device 1 as the MMC objects, browser:email.ipaddress, browser: email.username, and browser:email.password, respectively. To authorize the secondary TPD 6 to provision these parameters on the mobile device 1, the primary TPD 5 could send the mobile device 1 an MMC document as follows:

```
<?xml version="1.0"?>
    <mmc status-uri="http://prov.carrier.net/">
        <method
            id="1"
          name="write"
            object="browser:domain . . . <1>.trusted"
            value="provsvr.someisp.com"
            Reportstatus="TRUE" />
        <method
            id="2"
            name="write"
            object="browser:domain . . . <1>.object . . . <1>.name"
            value="browser:email.ipaddress"
            Reportstatus="TRUE" />
        <method
            id="3"
            name="write"
            object="browser:domain . . . <1>.object . . . <2>.name"
            value="browser:email.username"
            Reportstatus="TRUE" />
        <method
            id="4"
            name="write"
            object="browser:domain . . . <1>.object . . . <3>.name"
            value="browser:email.password"
            Reportstatus="TRUE" />
    </mmc>
```

A secondary TPD 6 provisions a mobile device 1 in essentially the same manner as the primary TPD 5 provisions the mobile device 1, i.e. by specifying the appropriate MMC objects and their values in an MMC document and the appropriate command (e.g., "write"). For example, to provision the above-mentioned email account information of a mobile device 1, a secondary TPD 6 could send the mobile device 1 an MMC document as follows:

```
<?xml version="1.0"?>
        <mmc status-uri="http: //prov.carrier.net/">
            <method
                id="1"
              name="write"
                object="browser:email.ipaddress"
                value="125.45.135.190"
                Reportstatus="TRUE" />
            <method
                id="2"
                name="write"
                object="browser:email.username"
                value="jd2001"
                Reportstatus="TRUE" />
            <method
                id="4"
                name="write"
                object="browser:email.password"
                value="guesswhoiam"
                Reportstatus="TRUE" />
    </mmc>
```

In response to a provisioning request, a mobile device 1 sends to the source of the provisioning request an MMC document indicating the result of the request. For the above example, such a document might appear as follows:

```
<?xml version="1.0"?>
        <mmc>
                <status mmc="OK" >
                    <detail  id="1"
                            name="write"
```

-continued

```
            object="browser:email.ipaddress"
            result="OK"/>
        <detail id="2"
            name="write"
            object="browser:email.username"
            result="OK"
        </status>
</mmc>
```

It may be assumed that each TPD 5 or 6 is capable of generating an MMC document in response to human inputs specifying MMC objects and their values, and is also capable of transmitting the MMC document to a mobile device 1. Referring again to FIG. 2, such capability is provided in the provisioning software 27 that executes on each TPD and provides a user interface appropriate for these tasks. The process of generating an MMC document can be implemented in any of various degrees of automation. The details of generating an MMC document and the extent of such automation are not necessary for an understanding of the present invention.

As indicated above, security is a significant concern when provisioning authority is granted to secondary TPDs outside the carrier's trusted domain. Consequently, digital signatures based on public key encryption may be used to carry out secure provisioning of mobile devices 1. The digital signature technique allows a TPD to digitally "sign" a provisioning request. The mobile device 1 to be provisioned uses the "certificate" of the TPD, which includes the TPD's public key, to decrypt and/or verify the authenticity of the provisioning message. The certificates are normally acquired from a trusted source, which performs any well-known, conventional form of validation before distributing them to a TPD.

Hence, in one embodiment, a separate MMC object, browser:domain.certificate, is used by the primary TPD 5 to provision its certificate in a mobile device 1. Another MMC object, browser:domain..<p>.certificate, is used by the primary TPD 5 to provision certificates of one or more secondary TPDs 6 in a mobile device 1 (where p is an array variable as described above). Generally, it will be desirable for the primary TPD 5 not to allow a secondary TPD 6 to provision its own certificate, for security reasons.

A potential alternative to public key encryption is to use symmetric key (also known as secret key or shared secret) encryption. However, symmetric key encryption is considered undesirable for this purpose. For optimum security, every mobile device should be assigned a different cryptographic key; yet assigning a different key to each mobile device complicates key management operations. Alternatively, some or all mobile devices might use the same key in a symmetric key system, which could compromise security. Hence, public key encryption is considered to be a superior solution, since it is more economical to distribute certificates than to store keys for a large number of mobile devices.

Thus, a method an apparatus have been described, for distributing the authorization to provision mobile devices on a wireless network between multiple provisioning servers, which may operate in different environments of trust. Although the present invention has been described with reference to specific exemplary embodiments, it will be evident that various modifications and changes may be made to these embodiments without departing from the broader spirit and scope of the invention as set forth in the claims.

Accordingly, the specification and drawings are to be regarded in an illustrative sense rather than a restrictive sense.

What is claimed is:

1. A method comprising:
   operating a primary trusted domain (TPD), wherein the primary TPD includes a primary provisioning server that operates within a trusted environment;
   using the primary TPD to provision a mobile device on a wireless network by sending a provisioning message from the primary TPD to the mobile device, the provisioning message specifying a secondary TPD authorized to provision the mobile device via a network and an identifier of one or more parameters which the secondary TPD is authorized to provision, the secondary TPD comprising a provisioning server; and
   using the primary TPD to provision the mobile device with a digital certificate of the secondary TPD identifying the secondary TPD to enable the secondary TPD to provision the mobile device using a digital signature.

2. A method as recited in claim 1, wherein the primary TPD is within a trusted environment, and wherein the secondary TPD is outside the trusted environment.

3. A method as recited in claim 2, wherein the secondary TPD communicates with the mobile device via a second network that is outside the trusted environment.

4. A method as recited in claim 1, wherein the provisioning message specifies a plurality of secondary TPDs authorized to provision the mobile device and one or more parameters which each of the secondary TPDs is authorized to provision.

5. A method comprising:
   operating a primary provisioning server within a predefined trusted environment, the primary provisioning server having authorization to provision a plurality of mobile devices on a wireless network;
   using the primary provisioning server to provision a digital certificate of the primary provisioning server in each of the mobile devices;
   using the primary provisioning server to provision a digital certificate of a secondary provisioning server in the mobile devices by sending the digital certificate of the secondary provisioning server from the primary provisioning server to each of the mobile devices, wherein the secondary provisioning server is on a second network outside the trusted environment; and
   using the primary provisioning server to provision the mobile devices with information indicating to the mobile devices authorization of the secondary provisioning server to provision the mobile devices by sending the information indicating authorization from the primary provisioning server to each of the mobile devices.

6. A method as recited in claim 5, wherein the primary and secondary provisioning servers each use their respective digital certificates when provisioning the mobile devices, to enable the mobile devices to authenticate provisioning messages from the primary and secondary provisioning servers.

7. A method as recited in claim 5, further comprising using the primary provisioning server to specify one or more parameters which the secondary provisioning server is authorized to provision in the mobile devices.

8. A method as recited in claim 5, further comprising using the primary provisioning server to provision the mobile devices with information indicating authorization of a plurality of secondary provisioning servers to provision the mobile devices.

9. A method as recited in claim 8, further comprising using the primary provisioning server to specify one or more parameters which each of the secondary provisioning servers is authorized to provision in the mobile devices.

10. A method as recited in claim 9, wherein said using the primary provisioning server to specify one or more parameters comprises assigning each of the secondary provisioning servers provisioning authorization of a different scope.

11. A method as recited in claim 5, wherein the primary provisioning server has unrestricted authorization to provision the mobile devices, and authorization of the secondary provisioning server to provision the mobile devices is regulated by the primary provisioning server.

12. A machine-readable program storage medium storing instructions which, when executed in a processing system, configure the processing system to operate as a primary provisioning server within a predefined trusted environment, the primary provisioning server having authorization to provision a plurality of mobile devices on a wireless network, such that the instructions configure the processing system to execute a process comprising:
provisioning a digital certificate of the primary provisioning server in each of the mobile devices;
provisioning a digital certificate of a secondary provisioning server in the mobile devices by sending the digital certificate of the secondary provisioning server from the primary provisioning server to each of the mobile devices, wherein the secondary provisioning server operates outside the trusted environment; and
provisioning the mobile devices with information indicating to the mobile devices authorization of the secondary provisioning server to provision the mobile devices by sending the information indicating authorization from the primary provisioning to each of the mobile devices.

13. A machine-readable program storage medium as recited in claim 12, wherein the primary and secondary provisioning servers each use their respective digital certificates when provisioning the mobile devices, to enable the mobile devices to authenticate provisioning messages from the primary and secondary provisioning servers.

14. A machine-readable program storage medium as recited in claim 12, wherein the process further comprises specifying one or more parameters which the secondary provisioning server is authorized to provision in the mobile devices.

15. A machine-readable program storage medium as recited in claim 12, wherein the process further comprises provisioning the mobile devices with information indicating authorization of a plurality of secondary provisioning servers to provision the mobile devices.

16. A machine-readable program storage medium as recited in claim 15, wherein the process further comprises specifying one or more parameters which each of the secondary provisioning servers is authorized to provision in the mobile devices.

17. A machine-readable program storage medium as recited in claim 16, wherein said specifying one or more parameters comprises assigning each of the secondary provisioning servers provisioning authorization of a different scope.

18. A machine-readable program storage medium as recited in claim 12, wherein the primary provisioning server has unrestricted authorization to provision the mobile devices, and authorization of the secondary provisioning server to provision the mobile devices is regulated by the primary provisioning server.

19. A method of operating a mobile device on a wireless network, the method comprising:
receiving at the mobile device, via the wireless network, a provisioning message from a first trusted provisioning domain (TPD), the provisioning message specifying a second TPD and indicating a parameter which the second TPD is authorized to provision in the mobile device, the secondary TPD comprising a provisioning server;
storing information identifying the second TPD and the parameter in the mobile device in response to the provisioning message;
provisioning the parameter in the mobile device in response to a provisioning message received over a network from the second TPD; and
receiving a digital certificate of the second TPD from the first TPD; and
using the digital certificate in the mobile device to authenticate the provisioning message from the second TPD.

20. A method as recited in claim 19, wherein the first TPD is within a trusted environment, and the second TPD is outside the trusted environment.

21. A method as recited in claim 19, wherein the provisioning message specifies a plurality of secondary TPDs and a parameter which each of the secondary TPDs is authorized to provision in the mobile device, the method further comprising storing information identifying each of the secondary TPDs and the corresponding parameters in response to the provisioning message.

22. A method of operating a mobile device on a wireless network, the method comprising:
receiving a provisioning message from a remote source, the provisioning message specifying a parameter;
determining whether the remote source is a primary trusted provisioning domain (TPD);
if the remote source is the primary TPD, provisioning the parameter in the mobile device in response to the provisioning message;
if the remote source is not the primary TPD, determining whether the remote source is a secondary TPD authorized to provision the parameter, based on a provisioning authorization previously received by the mobile device from the primary TPD;
if the remote source is a secondary TPD authorized to provision the parameter, provisioning the parameter in the mobile device in response to the provisioning message;
receiving a digital certificate of the secondary TPD from the primary TPD; and
using the digital certificate in the mobile device to authenticate the provisioning message.

23. A method as recited in claim 22, wherein the primary TPD operates within a trusted environment, and the secondary TPD operates outside the trusted environment.

24. A method as recited in claim 22, wherein the provisioning message specifies a plurality of secondary TPDs and a parameter which each of the secondary TPDs is authorized to provision in the mobile device, the method further comprising storing information identifying each of the secondary TPDs and the corresponding parameters in response to the provisioning message.

25. A mobile device configured to operate on a wireless network, the mobile device comprising:
a processor;
a data communication device coupled to the processor to communicate data with one or more remote systems via the wireless network; and a memory coupled to the processor and storing instructions for execution by the processor to configure the mobile device to execute a process comprising receiving a provisioning message at the mobile device from a first trusted provisioning domain (TPD) via the wireless network, the provisioning message specifying a second TPD and indicating a parameter which the second TPD is authorized to provision in the mobile device;

storing information identifying the second TPD and the parameter in the mobile device in response to the provisioning message;

provisioning the parameter in the mobile device in response to a provisioning message from the second TPD;

receiving a digital certificate of the second TPD from the first TPD; and using the digital certificate in the mobile device to authenticate the provisioning message from the second TPD.

26. A mobile device as recited in claim 25, wherein the first TPD is within a trusted environment, and the second TPD is outside the trusted environment.

27. A mobile device as recited in claim 25, wherein the provisioning message specifies a plurality of secondary TPDs and a parameter which each of the secondary TPDs is authorized to provision in the mobile device, and wherein the process further comprises storing information identifying each of the secondary TPDs and the corresponding parameters in response to the provisioning message.

28. A mobile device configured to operate on a wireless network, the mobile device comprising:

a processor;

a data communication device coupled to the processor to communicate data with one or more remote systems via the wireless network; and a memory coupled to the processor and storing instructions for execution by the processor to configure the mobile device to execute a process comprising receiving a provisioning message from a remote source, the provisioning message specifying a parameter;

determining whether the remote source is a primary trusted provisioning domain (TPD);

if the remote source is the primary TPD, provisioning the parameter in the mobile device in response to the provisioning message;

if the remote source is not the primary TPD, determining whether the remote source is a secondary TPD authorized to provision the parameter, based on a provisioning authorization previously received by the mobile device from the primary TPD;

if the remote source is a secondary TPD authorized to provision the parameter, provisioning the parameter in the mobile device in response to the provisioning message;

receiving a digital certificate of the secondary TPD from the primary TPD; and using the digital certificate in the mobile device to authenticate the provisioning message.

29. A mobile device as recited in claim 28, wherein the primary TPD operates within a trusted environment, and the secondary TPD operates outside the trusted environment.

30. A mobile device as recited in claim 28, wherein the provisioning message specifies a plurality of secondary TPDs and a parameter which each of the secondary TPDs is authorized to provision in the mobile device, and wherein the process further comprises storing information identifying each of the secondary TPDs and the corresponding parameters in response to the provisioning message.

* * * * *